US009516247B2

United States Patent
Shin et al.

(10) Patent No.: US 9,516,247 B2
(45) Date of Patent: Dec. 6, 2016

(54) IMAGE SENSING DEVICE FOR IMPROVING DYNAMIC RANGE

(71) Applicant: SK hynix Inc., Gyeonggi-do (KR)

(72) Inventors: Min-Seok Shin, Gyeonggi-do (KR); Young-Chul Sohn, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/490,386

(22) Filed: Sep. 18, 2014

(65) Prior Publication Data

US 2015/0296157 A1   Oct. 15, 2015

(30) Foreign Application Priority Data

Apr. 11, 2014  (KR) .................. 10-2014-0043322

(51) Int. Cl.
*H04N 5/355*     (2011.01)
*H04N 5/374*     (2011.01)
*H04N 9/04*      (2006.01)
*H04N 5/378*     (2011.01)

(52) U.S. Cl.
CPC ...... *H04N 5/35581* (2013.01); *H04N 5/35554* (2013.01); *H04N 5/374* (2013.01); *H04N 5/378* (2013.01); *H04N 9/045* (2013.01)

(58) Field of Classification Search
CPC  H04N 5/35581; H04N 5/35554; H04N 5/374; H04N 9/045; H04N 5/378
USPC ........................................................ 348/276
See application file for complete search history.

(56) References Cited

U.S. PATENT DOCUMENTS

| 7,911,507 | B2 * | 3/2011 | Egawa | H04N 5/35581 |
| | | | | 348/230.1 |
| 8,031,243 | B2 * | 10/2011 | Imai | H04N 5/332 |
| | | | | 348/272 |
| 2009/0295973 | A1 * | 12/2009 | Oshikubo | H04N 5/3559 |
| | | | | 348/311 |
| 2011/0043670 | A1 * | 2/2011 | Azuma | H04N 5/145 |
| | | | | 348/279 |
| 2012/0218426 | A1 * | 8/2012 | Kaizu | H04N 5/35554 |
| | | | | 348/208.4 |
| 2013/0057744 | A1 * | 3/2013 | Minagawa | H04N 5/35563 |
| | | | | 348/311 |

(Continued)

FOREIGN PATENT DOCUMENTS

KR   1020100086987   8/2010
KR   1020120088605   8/2012

OTHER PUBLICATIONS

Sakakibara, M., et al., An 83dB-Dynamic-Range Single-Exposure Global-Shutter CMOS Image Sensor with In-Pixel Dual Storage, ISSCC 2012 / Session 22 / Image Sensors / 22.1, 2012 IEEE International Solid-State Circuits Conference, pp. 380-382.

(Continued)

*Primary Examiner* — Albert Cutler
(74) *Attorney, Agent, or Firm* — IP & T Group LLP

(57) ABSTRACT

An image sensing device includes a unit pixel including one or more first sub-pixels of a white color and a plurality of second sub-pixels of a color other than the white color in a matrix, a row control block suitable for controlling the first and second sub-pixels to output sequentially first and second pixel signals during one row unit time, and an image process block suitable for processing the first and second pixel signal's.

8 Claims, 6 Drawing Sheets

(56) References Cited

U.S. PATENT DOCUMENTS

2014/0192250 A1* 7/2014 Mitsunaga ........... H04N 5/3535
                                                        348/349

OTHER PUBLICATIONS

El Gamal, A., et al., CMOS Image Sensors, IEEE Circuits & Devices Magazine, 2005, pp. 6-20.

* cited by examiner

IMAGE SENSING DEVICE FOR IMPROVING DYNAMIC RANGE

CROSS-REFERENCE TO RELATED APPLICATIONS

The present application claims priority of Korean Patent Application No. 10-2014-0043322, filed on Apr. 11, 2014, which is incorporated herein by reference in its entirety.

BACKGROUND

1. Field

Exemplary embodiments of the present invention relate to a semiconductor design technology, and more particularly, to an image sensing device.

2. Description of the Related Art

Image sensing devices capture images using photoreactive semiconductors. Image sensing devices may be divided into those using Charge Coupled Device (CCD) technology and those using Complementary Metal Oxide Semiconductor (CMOS) technology. Image sensing devices using CMOS technology are in wide use since it allows for an analog circuit and a digital control circuit to be realized on a single integrated circuit (IC).

SUMMARY

Exemplary embodiments of the present invention are directed to an image sensing device that improves dynamic range, sensitivity, and the Signal-to-Noise Ratio (SNR).

In accordance with an embodiment of the present invention, an image sensing device includes a unit pixel including one or more first sub-pixels of a white color and a plurality of second sub-pixels of a color other than the white color in a matrix, a row control block suitable for controlling the first and second sub-pixels to sequentially output first and second sub-pixel signals during one row unit time, and an image process block suitable for processing the first and second sub-pixel signals.

Herein, the one row unit time may be defined by an equation expressed as 1/frame rate/the total number of rows, wherein the total number of the rows is determined based on the unit pixel.

In accordance with another embodiment of the present invention, an image sensing device may include a plurality unit pixels arranged in rows and columns and each including a plurality of sub-pixels in a matrix, wherein one or more first sub-pixels among the sub-pixels correspond to a white color and second sub-pixels other than the first sub-pixels among the sub-pixels correspond to one color other than the white color, a row control block suitable for controlling the first and second sub-pixels to have different exposure times during an exposure section and sequentially output first and second sub-pixel signals, respectively, during a read section, and an image process block suitable for generating image data based on the second sub-pixel signals and compensating for sensitivity and signal-to-noise ratio (SNR) of the image data based on the first sub-pixel signal.

DETAILED DESCRIPTION

Figure 1:
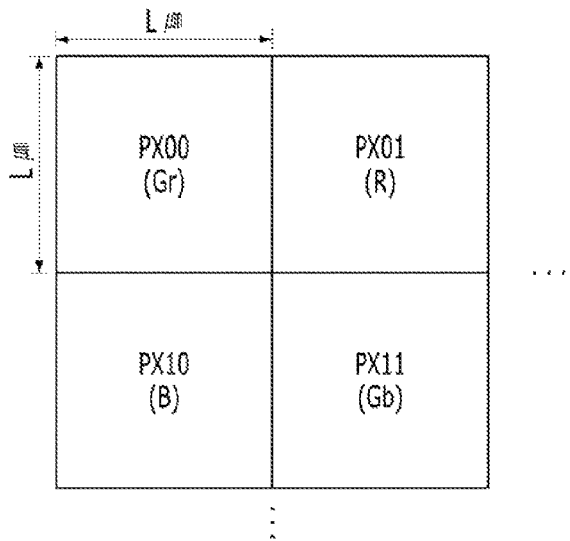
FIG. 1 is a diagram illustrating a structure of a pixel array included in an image sensing device as a comparative example.

Exemplary embodiments of the present invention are described below in more detail with reference to the accompanying drawings. The present invention may, however, be embodied in different forms and should not be construed as limited to the embodiments set forth herein. Rather, these embodiments are provided so that this disclosure is thorough and complete, and fully convey the scope of the present invention to those skilled in the art. Throughout the disclosure, like reference numerals refer to like parts throughout the various figures and embodiments of the present invention.

FIG. 1 is a diagram illustrating a structure of a pixel array included in an image sensing device as a comparative example.

Referring to FIG. 1, the image sensing device may include a pixel array in which a plurality of unit pixels are arranged in a matrix. For example, the pixel array may be arranged in a Bayer pattern. The Bayer pattern may be formed of repetitive cells each composed of 2 by 2 unit pixels. In each of the cells, unit pixels PX00 and PX11 of two green colors Gr and Gb may be disposed to be diagonal to each other, and a unit pixel PX01 of a red color R and a unit pixel PX10 of a blue color B may be disposed to be diagonal to each other in the two remaining corners.

Each of the unit pixels has a predetermined size $L\mu m \times L\mu m$, and it is not easy to miniaturize the image sensing device, i.e., the size of the unit pixel, because the sensitivity and the Signal-to-Noise Ratio (SNR) thereof may deteriorate due to the miniaturization.

Figure 2:
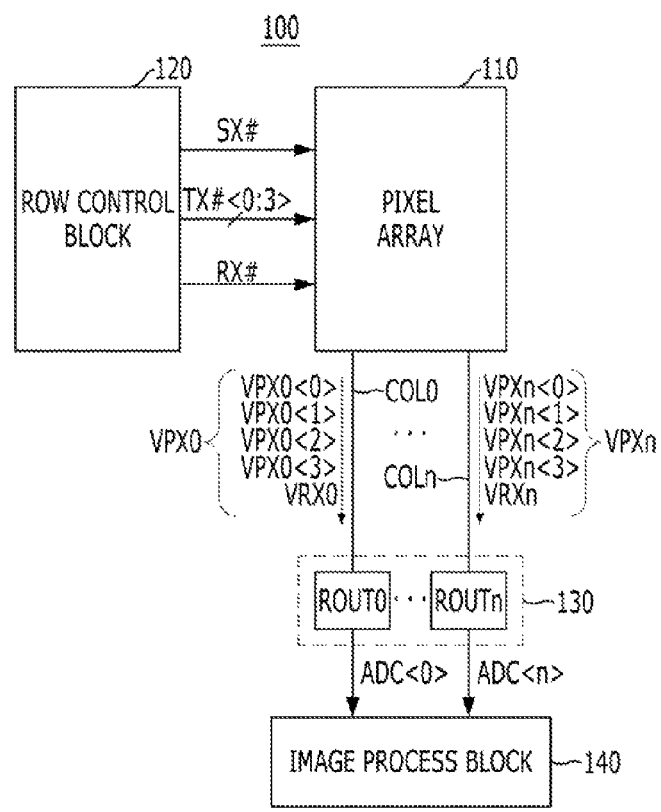
FIG. 2 is a block diagram illustrating an image sensing device in accordance with an embodiment of the present invention.
Figure 3:
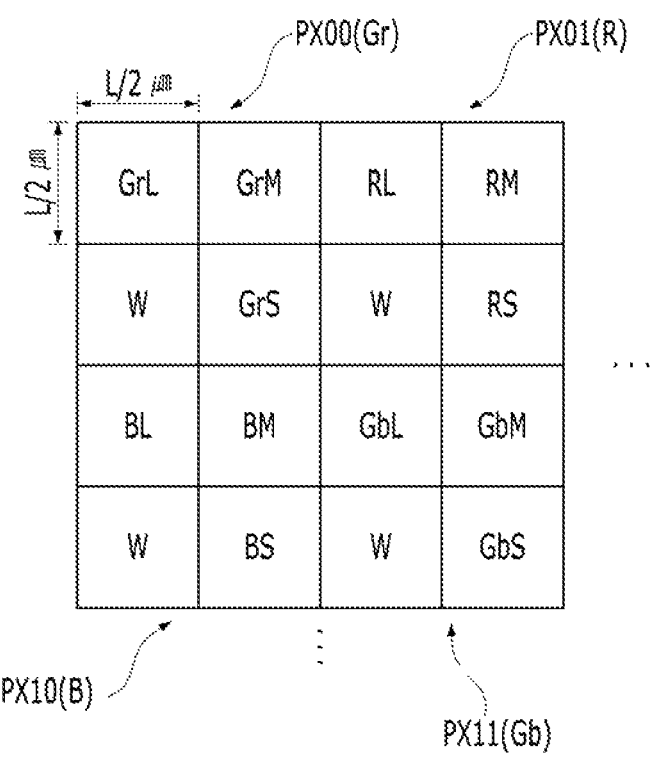
FIG. 3 is a diagram illustrating a structure of a pixel array shown in FIG. 2.
Figure 4:
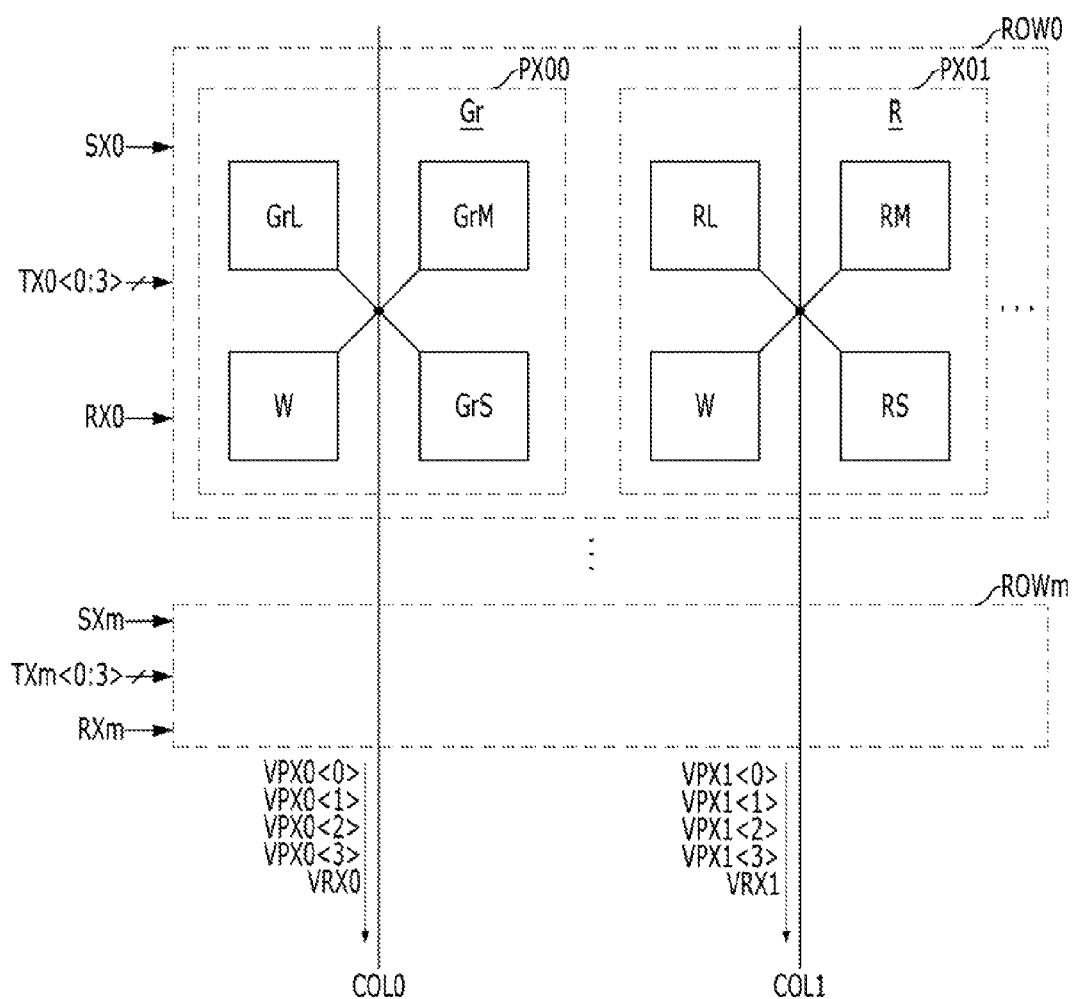
FIG. 4 is a diagram illustrating in detail the pixel array shown in FIG. 3.
Figure 5:
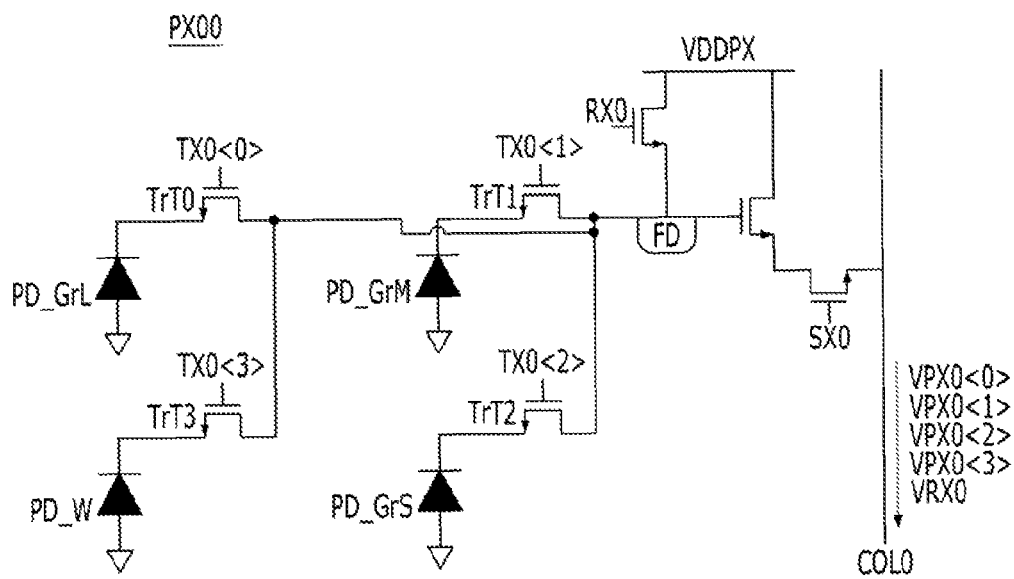
FIG. 5 is a circuit diagram exemplarily illustrating a unit pixel shown in FIG. 4.

FIG. 2 is a block diagram illustrating an image sensing device in accordance with an embodiment of the present invention. FIG. 3 is a diagram illustrating a structure of a pixel array shown in FIG. 2. FIG. 4 is a diagram illustrating in detail the pixel array shown in FIG. 3. FIG. 5 is a circuit diagram exemplarily illustrating a unit pixel shown in FIG. 4.

Referring to FIG. 2, an image sensing device 100 may include a pixel array 110, a row control block 120, a read path block 130, a plurality of column lines COL0 to COLn, and an image process block 140. The pixel array 110 includes a plurality of unit pixels arranged in a matrix. The row control block 120 controls an operation of the pixel array 110 during an exposure section and a read section. The read path block 130 converts a plurality of pixel signals VPX0 to VPXn outputted from the pixel array 110 to digital signals during the read section. The column lines COL0 to COLn transmit the plurality of pixel signals VPX0 to VPXn. The image process block 140 processes a plurality of digital signals ADC<0:n> outputted from the read path block 130.

As shown in FIG. 3, the pixel array 110 may include a plurality of unit pixels PX00 to PXmn arranged in a matrix.

For example, the pixel array 110 may be arranged in a Bayer pattern. The Bayer pattern may be formed of repetitive cells each composed of 2 by 2 unit pixels, e.g., PX00, PX01, PX10 and PX11. In each of the cells, the unit pixels PX00 and PX11 of two green colors Gr and Gb may be disposed to be diagonal to each other, and the unit pixel PX01 of a red color R and a unit pixel PX10 of a blue color B may be disposed to be diagonal to each other in the two remaining corners.

Particularly, each of the unit pixels PX00 to PXmn may include four sub-pixels which include three sub-pixels corresponding to its original color and one sub-pixel corresponding to a white color. For example, the unit pixel PX00 of a green color Gr may include first to third sub-pixels GrL, GrM and GrS of the green color and a fourth sub-pixel W of a white color, and the unit pixel PX11 of a green color Gb may include first to third sub-pixels GbL, GbM and GbS of the green color and a fourth sub-pixel W of a white color. The unit pixel PX01 of a red color R may include first to third sub-pixels RL, RM and RS of the red color and a fourth sub-pixel W of a white color, and the unit pixel PX10 of a blue color B may include first to third sub-pixels BL, BM and BS of the blue color and a fourth sub-pixel W of a white color.

The pixel array 110 may be controlled on the basis of a row by the row control block 120. For example, referring to FIG. 4, the pixel array 110 may include a plurality of rows ROW0 to ROWm where respective control signals may be applied. For example, the unit pixels PX00 to PX0n included in the first row ROW0 may be controlled in common based on a first selection signal SX0, first to fourth transfer signals TX0<0:3>, and a first reset signal RX0. Also, the unit pixels PX00 to PX0n may be coupled with the column lines COL0 to COLn, respectively. Particularly the first to fourth sub-pixels included in one of the unit pixels PX00 to PX0n may be coupled with a corresponding one of the column lines COL0 to COLn in common. For example, the first to fourth sub-pixels GrL, GrM, GrS and W included in the unit pixel PX00 of a green color Gr are coupled with the first column line COL0 in common. The other rows ROW1 to ROWm may have the same structure.

Subsequently, internal structures and coupling relationships of the unit pixels PX00 to PX0n are described in detail below. Since the internal structures of the unit pixels PX00 to PX0n are all the same, the first unit pixel PX00 of a green color Gr is representatively described hereafter. The first unit pixel PX00 may have a four-shared sub-pixel structure as shown in FIG. 5. In other words, the first unit pixel PX00 may include four photo-diodes PD_GrL, PD_GrM, PD_GrS and PD_W corresponding to the first to fourth sub-pixels GrL, GrM, GrS and W, which are coupled with a floating diffusion node FD in common through four transfer transistors TrT0, TrT1, TrT2 and TrT3, respectively. The first unit pixel PX00 having the aforementioned structure selectively outputs first to fourth sub-pixel signals VPX0<0>, VPX0<1>, VPX0<2> and VPX0<3> and a first common reset signal VRX0 based on the first reset signal RX0, the first to fourth transfer signals TX0<0:3> and the first selection signal SX0.

Referring back to FIG. 2, the row control block 120 may control exposure times of the four sub-pixels included in the unit pixels PX00 to PXmn, during the expose section. For example, when the first sub-pixel GrL among the four sub-pixels has a first exposure time, the second sub-pixel GrM among the four sub-pixels has a second exposure time which is shorter than the first exposure time, and the third sub-pixel GrS among the four sub-pixels has a third exposure time which is shorter than the second exposure time, and the fourth sub-pixel W among the four sub-pixels has a fourth exposure time which is shorter than the third exposure time, during the exposure section. For another example, the row control block 120 may control the first to third sub-pixels GrL, GrM and GrS among the four sub-pixels included in the unit pixels PX00 to PXmn to have the same fifth exposure time, and control the fourth sub-pixel W among the four sub-pixels included in the unit pixels PX00 to PXmn to have a sixth exposure time which is shorter than the fifth exposure time, during the exposure section.

The row control block 120 may control read operations of the rows ROW0 to ROWm every one row unit time during the read section. The one row unit time is a read-out time assigned per a unit pixel, and may be defined by the following Equation 1.

$$1/\text{frame rate}/\text{the total number of the rows} \qquad \text{[Equation 1]}$$

In Equation 1 the total number of the rows may be determined on the basis of the unit pixel. For example, the total number of the rows may be M+1 (refer to FIG. 4).

For example, the row control block 120 may control the unit pixels PX00 to PX0n included in the first row ROW0 to perform read-out operations simultaneously during a first row unit time, control the unit pixels PX10 to PX1n included in the second row ROW1 to perform read-out operations during a second row unit time, and control the unit pixels included in the other rows ROW2 to ROWm to perform read-out operations in a like manner.

The row control block 120 may control the first to fourth sub-pixel signals VPX#<0:3>, which are output signals of the first to fourth sub-pixels, to be sequentially outputted through the corresponding column line COL# during one row unit time. For example, the row control block 120 may control the first to fourth sub-pixel signals VPX0<0>, VPX0<1>, VPX0<2> and VPX0<3>, which are output signals of the first to fourth sub-pixels GrL, GrM, GrS and W, to be sequentially outputted through the first column line COL0 during one row unit time. Otherwise, the row control block 120 may control the first to third sub-pixel signals VPX#<0:2>, which are output signals of the first to third sub-pixels, to be outputted simultaneously through the corresponding column line COL#, and control the fourth sub-pixel signal VPX#<3>, which is an output signal of the fourth sub-pixel, to be outputted alone through the corresponding column line COL#, during one row unit time. For example, the row control block 120 may control the first to third sub-pixel signals VPX0<0>, VPX0<1> and VPX0<2>, which are output signals of the first to third sub-pixels GrL, GrM and GrS, to be added up and outputted through the first column line COL0, and then control the fourth sub-pixel signal VPX0<3> to be outputted through the first column line COL0, during one row unit time.

The read path block 130 may include a plurality of read-out parts ROUT0 to ROUTn. The read-out part ROUT# may convert the first to fourth sub-pixel signals VPX#<0:3> to the digital signals ADC<#>. For example, the read-out part ROUT# may include a sampling unit for generating a sampling signal by sampling the first to fourth sub-pixel signals VPX#<0:3> in a Correlated-Double Sampling (CDS) scheme, a comparison unit for generating a comparison signal by comparing the sampling signal with a ramp signal, a counting unit for generating a counting signal by counting the comparison signal, and a latch unit for latching the counting signal.

The image process block 140 may obtain first to third image data of the same color having different exposure times based on the first to third sub-pixel signals VPX#<0:2>, and obtain a white image data based on the fourth sub-pixel signal VPX#<3>.

Hereafter, an operation of the image sensing device 100 having the aforementioned structure in accordance with the embodiment of the present invention is described with reference to FIGS. 6A and 6B.

For the simple description in the embodiment of the present invention, an operation corresponding to the first unit pixel PX00 is representatively described.

Figure 6A:
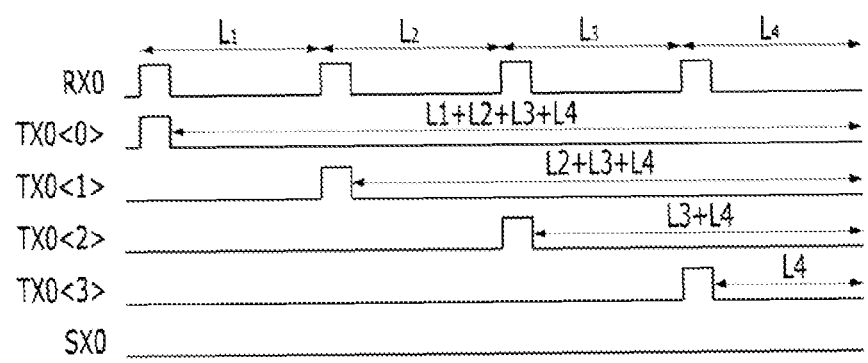
FIGS. 6A and 6B and FIGS. 7A and 7B are timing diagrams illustrating an operation of the image sensing device in accordance with the embodiment of the present invention.
Figure 6B:
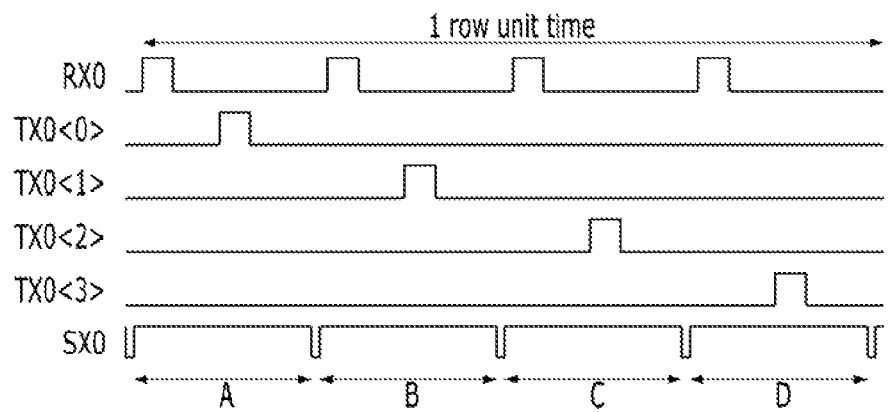

FIGS. 6A and 6B are timing diagrams exemplarily illustrating an operation of the image sensing device 100 in accordance with an embodiment of the present invention.

First of all, an operation of the image sensing device 100 during an exposure section is described below with reference to FIG. 6A.

Referring to FIG. 6A, the row control block 120 may control the first sub-pixel GrL among the four sub-pixels included in the first unit pixel PX00 to have a first exposure time L1+L2+L3+L4, and control the second sub-pixel GrM among the four sub-pixels included in the first unit pixel PX00 to have a second exposure time L2+L3+L4, and control the third sub-pixel GrS among the four sub-pixels included in the first unit pixel PX00 to have a third exposure time L3+L4, and control the fourth sub-pixel W among the four sub-pixels included in the first unit pixel PX00 to have a fourth exposure time L4, during the exposure section. This is described in detail below.

The first sub-pixel GrL is initialized in response to the first reset signal RX0 and the first transfer signal TX0<0> which pulse simultaneously at a predetermined moment. For example, an initialization operation of the first sub-pixel GrL indicates that a first photo-diode PD_GrL is initialized while a charge existing in the first photo-diode PD_GrL is discharged to a power supply voltage VDD_PX terminal through a first transfer transistor TrT0 and a first reset transistor TrR0. The second sub-pixel GrM is initialized in response to the first reset signal RX0 and the second transfer signal TX0<1> which pulse simultaneously in a predetermined time L1 from the initialization operation of the first sub-pixel GrL. An initialization operation of the second sub-pixel GrM is the same as the initialization operation of the first sub-pixel GrL. The third sub-pixel GrS is initialized in response to the first reset signal RX0 and the third transfer signal TX0<2> which pulse simultaneously in a predetermined time L2 from the initialization operation of the second sub-pixel GrM. An initialization operation of the third sub-pixel GrS is the same as the initialization operation of the first sub-pixel GrL. The fourth sub-pixel W is initialized in response to the first reset signal RX0 and the fourth transfer signal TX0<3> which pulse simultaneously in a predetermined time L3 from the initialization operation of the third sub-pixel GrS. An initialization operation of the fourth sub-pixel W is the same as the initialization operation of the first sub-pixel GrL. Meanwhile, the first to fourth sub-pixels GrL, GrM, GrS and W may have the exposure times from their initialization operations to another pulses of the transfer signals TX0<0:3>, respectively. Since each of the transfer signals TX0<0:3> pulses again during a read section, it is obvious that an actual exposure time includes a time taken from first pulses of the transfer signals TX0<0:3> during the exposure section to second pulses of the transfer signals TX0<0:3> during the read section. Since an interval between the second pulses of the first to third transfer signals TX0<0:3> during the read section is negligibly shorter than an interval between the first pulses of the first and third transfer signals TX0<0:3> during the exposure section although not illustrated in FIG. 7, an exposure time during the read section may be out of consideration.

Next, an operation of the image sensing device 100 during a read section is described below with reference to FIG. 6B.

Referring to FIG. 6B, the row control block 120 may control the first to fourth sub-pixels GrL, GrM, GrS and W to sequentially output the first to fourth sub-pixel signals VPX0<0>, VPX0<1>, VPX0<2> and VPX0<3> along with the first common reset signal VRX0 during the read section. This is described in detail below.

The first sub-pixel GrL may sequentially output the first common reset signal VRX0 and the first sub-pixel signal VPX0<0> in response to the first reset signal RX0 and the first transfer signal TX0<0> which sequentially pulse during a first section A of the read section. The first sub-pixel signal VPX0<0> is a pixel signal which is generated on the basis of a charge photoelectric-converted by the first photo-diode PD_GrL during the first exposure time L1+L2+L3+L4. The second sub-pixel GrM may sequentially output the first common reset signal VRX0 and the second sub-pixel signal VPX0<1> in response to the first reset signal RX0 and the second transfer signal TX0<1> which sequentially pulses during a second section B of the read section. The second sub-pixel signal VPX2<0> is a pixel signal which is generated on the basis of a charge photoelectric-converted by the second photo-diode PD_GrM during the second exposure time L2+L3+L4. The third sub-pixel GrS may sequentially output the first common reset signal VRX0 and the third sub-pixel signal VPX0<2> in response to the first reset signal RX0 and the third transfer signal TX0<2> which sequentially pulses during a third section C of the read section. The third sub-pixel signal VPX3<0> is a pixel signal which is generated on the basis of a charge photoelectric-converted by the third photo-diode PD_GrS during a third exposure time L3+L4. The fourth sub-pixel W may sequentially output the first common reset signal VRX0 and the fourth sub-pixel signal VPX0<3> in response to the first reset signal RX0 and the fourth transfer signal TX0<3> which sequentially pulses during a fourth section D of the read section. The fourth sub-pixel signal VPX4<0> is a pixel signal which is generated on the basis of a charge photoelectric-converted by the fourth photo-diode PD_W during a fourth exposure time L4.

The first read-out part ROUT0 outputs the first digital signals ADC<0> on the basis of the first to fourth sub-pixel signals VPX0<0>, VPX0<1>, VPX0<2> and VPX0<3> which are sequentially inputted with the first common reset signal VRX0.

For example, the first read-out part ROUT0 may generate a first sampling signal by sampling the first common reset signal VRX0 and the first sub-pixel signal VPX0<0>, which are sequentially inputted during the first section A, in a Correlated-Double Sampling (CDS) scheme, generate a first comparison signal by comparing the first sampling signal with a ramp signal, and generate a first counting signal by digital-counting the first comparison signal. The first read-out part ROUT0 may output the first counting signal as the first digital signal ADC<0>. The first read-out part ROUT0 may generate a second sampling signal by sampling the first common reset signal VRX0 and the second sub-pixel signal VPX0<1>, which are sequentially inputted during the second section B, in the CDS scheme, generate a second comparison signal by comparing the second sampling signal with the ramp signal, and generate a second counting signal by digital-counting the second comparison signal. The first read-out part ROUT0 may output the second counting signal as the first digital signal ADC<0>. The first read-out part ROUT0 may generate a third sampling signal by sampling the first common reset signal VRX0 and the third sub-pixel signal VPX0<2>, which are sequentially inputted during the third section C, in the CDS scheme, generate a third comparison signal by comparing the third sampling signal with the ramp signal, and generate a third counting signal by digital-counting the third comparison signal. The first read-out part ROUT0 may output the third counting signal as the first digital signal ADC<0>. The first read-out part ROUT0 may generate a fourth sampling signal by sampling the first common reset signal VRX0 and the fourth sub-pixel signal VPX0<3>, which are sequentially inputted during the fourth section D, in the CDS scheme, generate a fourth comparison signal by comparing the fourth sampling signal with the ramp signal, and generate a fourth counting signal by digital-counting the fourth comparison signal. The first read-out part ROUT0 may output the fourth counting signal as the first digital signal ADC<0>. In short, the first read-out part ROUT0 may internally generate the first to fourth counting signals during the first to fourth sections A, B, C and D, and sequentially output the first to fourth counting signals as the first digital signal ADC<0> to the image process block 140. Although it is described as an example that the first read-out part. ROUT0 sequentially outputs the first to fourth counting signals as the first digital signal ADC<0> in the embodiment of the present invention, it does not limit the scope of the present invention, and the first read-out part ROUT0 may simultaneously output the first to fourth counting signals as the first to fourth digital signals.

The image process block 140 may generate first to third image data having different exposure times and simultaneously compensate for the deteriorated sensitivity and SNR based on the first digital signal ADC<0>. For example, the image process block 140 may generate the first to third image data corresponding to the first to third counting signals which are sequentially inputted as the first digital signal ADC<0>. The first image data has the longest exposure time L1+L2+L3+L4 among the first to third image data, and the second image data has the medium exposure time L2+L3+L4 among the first to third image data, and the third image data has the shortest exposure time L3+L4 among the first to third image data. The image process block 140 may compensate for the deteriorated sensitivity and SNR based on the fourth counting signal which is inputted as the first digital signal ADC<0>. The fourth counting signal is a signal which is generated based on the fourth sub-pixel signal VPX0<3> outputted from the fourth sub-pixel W of a white color, and may be used to improve the sensitivity and SNR. Since the method of compensating for the sensitivity and SNR is widely-known, a detailed description thereon is omitted.

Figure 7A:
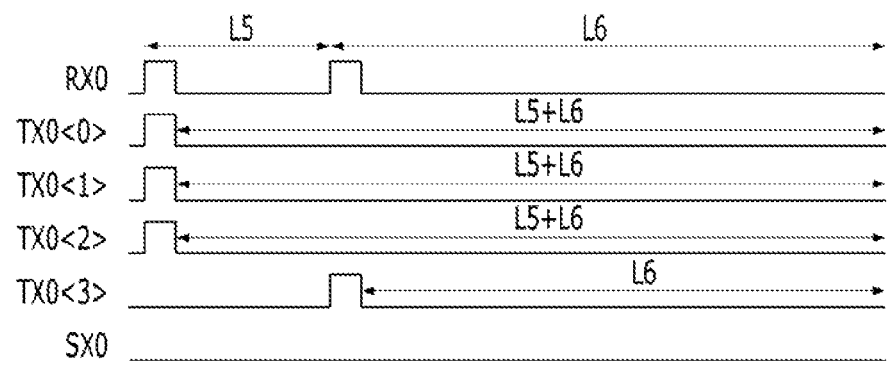
Figure 7B:
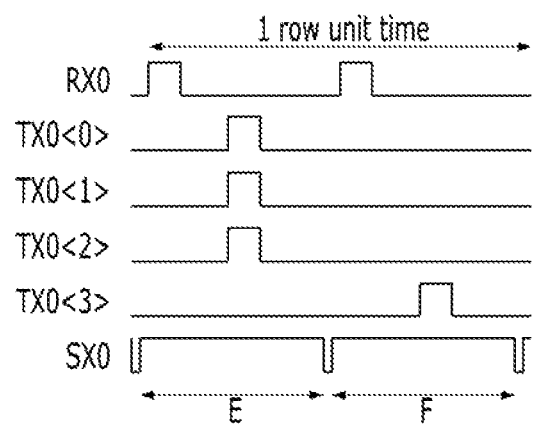

FIGS. 7A and 7B are timing diagrams exemplarily illustrating an operation of the image sensing device 100 in accordance with another embodiment of the present invention.

First of all, an operation of the image sensing device 100 during an exposure section is described below with reference to FIG. 7A.

Referring to FIG. 7A, the row control block 120 may control the first to third sub-pixel GrL, GrM and GrS among the four sub-pixels included in the first unit pixel PX00 to have a fifth exposure time L5+L6, and control the fourth sub-pixel W among the four sub-pixels included in the first unit pixel PX00 to have a sixth exposure time L6, during the exposure section. This is described in detail below.

The first to third sub-pixels GrL, GrM and GrS may be simultaneously initialized in response to the first reset signal RX0 and the first to third transfer signals TX0<0:2> which pulse simultaneously at a predetermined moment. The fourth sub-pixel W may be initialized in response to the first reset signal RX0 and the fourth transfer signal TX0<3> which pulse simultaneously in a predetermined time L5 from initialization operations of the first to third sub-pixels GrL, GrM and GrS. Initialization operations of the first to fourth sub-pixels GrL, GrM, GrS and W may be the same as the aforementioned initialization operations (refer to FIG. 6A). Consequently, the first to third sub-pixels GrL, GrM and GrS may have the fifth exposure time L5+L6, and the fourth sub-pixel W may have the sixth exposure time L6. In the fifth exposure time L5+L6 and the sixth exposure time L6, an exposure time during a read section is out of consideration.

Next, an operation of the image sensing device 100 during a read section is described below with reference to FIG. 7B.

Referring to FIG. 7B, the first unit pixel PX00 may output the first common reset signal VRX0 in response to the first reset signal RX0 which pulses first during a fifth section E of the read section, and output a first combination sub-pixel signal VPX0<4> in response to the first to third transfer signals TX0<0:2> which pulse later than the first reset signal RX0 during the fifth section E of the read section. The first combination sub-pixel signal VPX0<4> may be a pixel signal which is generated from a combination of the charges that are obtained from the photoelectric conversion of the first to third photo-diodes PD_GrL, PD_GrM and PD_GrS during the fifth exposure time L5+L6.

The first unit pixel PX00 may output the first common reset signal VRX0 in response to the first reset signal RX0 which pulses first during a sixth section F of the read section, and output a first individual sub-pixel signal VPX0<5> in response to the fourth transfer signal TX0<3> which pulses later than the first reset signal RX0 during the sixth section F of the read section. The first individual sub-pixel signal VPX0<5> may be a pixel signal which is individually generated based on the charges obtained from the photoelectric conversion of the fourth photo-diode PD_W during the sixth exposure time L6.

The first read-out part ROUT0 may generate a first sampling signal by sampling the first common reset signal VRX0 and the first combination sub-pixel signal VPX0<4>, which are sequentially inputted during the fifth section E, in a Correlated-Double Sampling (CDS) scheme, generate a first comparison signal by comparing the first sampling signal with a ramp signal, and generate a first counting signal by digital-counting the first comparison signal. The first read-out part ROUT0 may output the first counting signal as the first digital signal ADC<0>. The first read-out part ROUT0 may generate a second sampling signal by sampling the first common reset signal VRX0 and the first individual sub-pixel signal VPX0<5>, which are sequentially inputted during the sixth section F, in the CDS scheme, generate a second comparison signal by comparing the second sampling signal with the ramp signal, and generate a second counting signal by digital-counting the second comparison signal. The first read-out part ROUT0 may output the second counting signal as the first digital signal ADC<0>. In short, the first read-out part ROUT0 may internally generate the first and second counting signals during the fifth and sixth sections E and F, and sequentially output the first and second counting signals as the first digital signal ADC<0> to the image process block 140. Although it is described as an example that the first read-out part ROUT0 sequentially outputs the first and second counting signals as the first digital signal ADC<0> in the embodiment of the present invention, it does not limit the scope of the present invention, and the first read-out part ROUT0 may simultaneously output the first and second counting signals as the first and second digital signals.

The image process block 140 may compensate for the deteriorated sensitivity and SNR based on the first digital signal ADC<0>. For example, the image process block 140 may generate a first image data compensated for the sensitivity and SNR based on the first counting signal which is inputted as the first digital signal ADC<0>. As described above, the first counting signal is generated based on the first combination sub-pixel signal VPX0<4>. Since the first combination sub-pixel signal VPX0<4> is the same as a signal where the first to third sub-pixel signals outputted from the first to third sub-pixels GrL, GrM and GrS are combined, the first combination sub-pixel signal VPX0<4> may have the sensitivity and SNR improved as compared with one sub-pixel signal. Also, the image process block 140 may additionally compensate for the sensitivity and SNR based on the second counting signal inputted as the first digital signal ADC<0>. The second counting signal is a signal which is generated based on the first individual sub-pixel signal VPX0<5> outputted from the fourth sub-pixel W of a white color, and may be used to improve the sensitivity and SNR. Since the method of compensating for the sensitivity and SNR is widely-know, a detailed description thereon is omitted.

In accordance with the embodiments of the present invention, it is advantageous in that the image sensing device may compensate for the sensitivity and SNR deteriorating due to a sub-pixel of a small size. Also, it is advantageous in that the image sensing device may improve the dynamic range as image data having different exposure times is obtained.

In accordance with the embodiments of the present invention, the image sensing device may improve the dynamic range as image data having different exposure times per frame is obtained. Also, the image sensing device may compensate for the sensitivity and SNR deteriorating due to a sub-pixel of a small size based on a pixel signal outputted from a sub-pixel of a white color. Therefore, motion artifacts occurring in moving images may be minimized, and image degradation may be improved.

While the present invention has been described with respect to the specific embodiments, it is noted that the embodiments of the present invention are not restrictive but descriptive. Further, it is noted that the present invention may be achieved in various ways through substitution, change, and modification, by those skilled in the art without departing from the scope of the present invention as defined by the following claims.

What is claimed is:

1. An image sensing device, comprising:
   a unit pixel including one first sub-pixel of a white color and three second sub-pixels of a color other than the white color in a matrix;
   a row control block that controls the three second sub-pixels to sequentially output three second sub-pixel signals through a common column line, and controls the first sub-pixel to output a first sub-pixel signal through the common column line, during a read section;
   an image process block that processes the first and second sub-pixel signals; and
   a read circuit block that converts one first sub-pixel signal and three second sub-pixel signals, which are selectively transmitted through the common column line from the one first sub-pixel and the three second sub-pixels, to digital signals, respectively, and transmits the digital signals to the image process block,
   wherein the image process block generates three image data having different exposure times based on the three second sub-pixel signals,
   wherein the common column line is coupled with the first sub-pixel and the second sub-pixels in common, and
   wherein the row control block controls one among the three second sub-pixels to have a first exposure time, controls another one among the three second sub-pixels to have a second exposure time which is shorter than the first exposure time, controls the other among the three second sub-pixels to have a third exposure time which is shorter than the second exposure time, and controls the first sub-pixel to have a fourth exposure time which is shorter than the third exposure time, during an exposure section.

2. The image sensing device of claim 1, wherein the read section is defined by an equation expressed as 1/frame rate/the total number of rows,
   wherein the total number of the rows is determined based on the unit pixel.

3. The image sensing device of claim 1, wherein the row control block controls the first and second sub-pixels to have different exposure times during the exposure section, and sequentially outputs the first and second sub-pixel signals during the read section.

4. The image sensing device of claim 1, wherein the image process block compensates for sensitivity and signal-to-noise ratio (SNR) of the image data based on the first sub-pixel signal.

5. The image sensing device of claim 1, wherein the color of the second sub-pixels includes one among a red color, a green color and a blue color.

6. An image sensing device, comprising:
   a unit pixel including one first sub-pixel of a white color and three second sub-pixels of a color other than the white color in a matrix;
   a row control block that controls the three second sub-pixels to simultaneously output three second sub-pixel signals through a common column line, and controls the first sub-pixel to output a first sub-pixel signal through the common column line, during a read section;
   an image process block that processes the first and second sub-pixel signals; and
   a read circuit block that converts one first sub-pixel signal and three second sub-pixel signals, which are selectively transmitted through the common column line from the one first sub-pixel and the three second sub-pixels, to digital signals, respectively, and transmits the digital signals to the image process block,
   wherein the row control block controls the three second sub-pixels to have a first exposure time, and controls the first sub-pixel to have a second exposure time, which is shorter than the first exposure time, during an exposure section,
   wherein the common column line is coupled with the first sub-pixel and the second sub-pixels in common.

7. The image sensing device of claim 6, wherein the image process block generates one image data based on the three second sub-pixel signals.

8. The image sensing device of claim 6, wherein the image process block compensates for sensitivity and signal-to-noise ratio (SNR) of the image data based on the first sub-pixel signal.

* * * * *